United States Patent [19]

Tanfield, Jr.

[11] Patent Number: 5,267,626
[45] Date of Patent: Dec. 7, 1993

[54] NEAR SURFACE VEHICLE

[76] Inventor: Theodore W. Tanfield, Jr., 427 44th St., West Palm Beach, Fla. 33407

[21] Appl. No.: 752,045

[22] Filed: Aug. 29, 1991

[51] Int. Cl.⁵ .............................................. B60V 1/11
[52] U.S. Cl. ..................................... 180/117; 180/120; 180/126; 244/2
[58] Field of Search .............. 180/116, 117, 120, 122, 180/126; 244/2, 91

[56] References Cited

U.S. PATENT DOCUMENTS

| | | | |
|---|---|---|---|
| 3,205,847 | 9/1965 | Smith | 180/126 X |
| 3,285,537 | 11/1966 | Whittley | 180/120 |
| 3,750,978 | 8/1973 | Cunningham | 244/2 |
| 3,931,942 | 1/1976 | Alpert | 244/2 X |
| 4,046,215 | 9/1977 | Hietanen et al. | 180/210 X |
| 4,899,954 | 2/1990 | Pruszenski, Jr. | 244/2 |
| 5,042,605 | 8/1991 | Moriwake | 180/117 |
| 5,072,894 | 12/1991 | Cichy | 244/91 |

*Primary Examiner*—Margaret A. Focarino
*Assistant Examiner*—C. Mattix
*Attorney, Agent, or Firm*—Foley & Lardner

[57] ABSTRACT

A near surface vehicle including a vehicle body including a nose section having a canard with lift and pitch control. The vehicle body including a cockpit or cabin with a main wing mounted adjacent or above the cabin and including ailerons for lift and roll control. The vehicle body further including a tail section having a tail surface and a thrust air fan for providing air for lift and propulsion of the vehicle. The vehicle including an air diverter for deflecting air into a controllable lift area for initial lift and air deflectors or rudders for controlling vehicle direction and vehicle reverse thrust.

19 Claims, 3 Drawing Sheets

NEAR SURFACE VEHICLE

BACKGROUND OF THE INVENTION

The present invention relates generally to a near surface vehicle and more particularly to a near surface vehicle combining ground effect and aerodynamic functions in a single vehicle.

Numerous types of ground effect vehicles have been developed for the purpose of improving near ground travel by utilizing the ground effect aerodynamic lift available in close proximity to the ground. The ground effect phenomenon results in higher lift versus drag ratios than are available in standard high altitude fixed wing vehicles or aircraft.

Some types of ground effect vehicles rely on a supporting air cushion to maintain the vehicle clearance over the ground or water surface. Such vehicles waste a considerable portion of their power in developing and then maintaining the required air cushion. Most ground effect vehicles include a skirt of flexible material around parts or all of the underside of the vehicle. This single air cushion can be divided to enhance the vehicle stability, as disclosed in various prior art vehicles. To avoid plow-in and roll problems such skirt heights typically are limited, which effects the crew and passenger comfort and limits wave or other obstacle clearance. Further, these ground effect vehicles generally are aerodynamically inefficient and extremely noisy.

A number of types of airfoil ground effect vehicles have been developed. Some types have conventional high aspect ratio's of six or above, but such vehicles have very large wing spans which makes these impractical vehicles to operate in restrictive areas such as harbors and sea ports. Other vehicle types have a low aspect ratio of about two or below. These airfoils or wings have low aerodynamic efficiency and hence end plates have been added to such designs to enhance lift. These vehicles typically do not have any or have severely limited hovering capability.

It therefore would be desirable to provide an improved near surface vehicle which combines the airfoil aerodynamics with the air cushion lift capability of air cushion type vehicles.

SUMMARY OF THE INVENTION

The present invention provides an improved near surface vehicle which initially utilizes a diverted thrust air cushion to attain lift and then utilizes airfoils to achieve lift at higher speeds. The near surface vehicle includes an aerodynamically shaped hull with rigid side walls and movable end flaps for forming an initial lift area. The initial lift is provided by diverting thrust air flow from the propulsion exit internally to the forward area of the enclosed hull lift area. Cruising lift is provided by fixed wing airfoils and the hull end flaps are pivoted up to reduce the airfoil drag while maintaining a ground effect operation.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
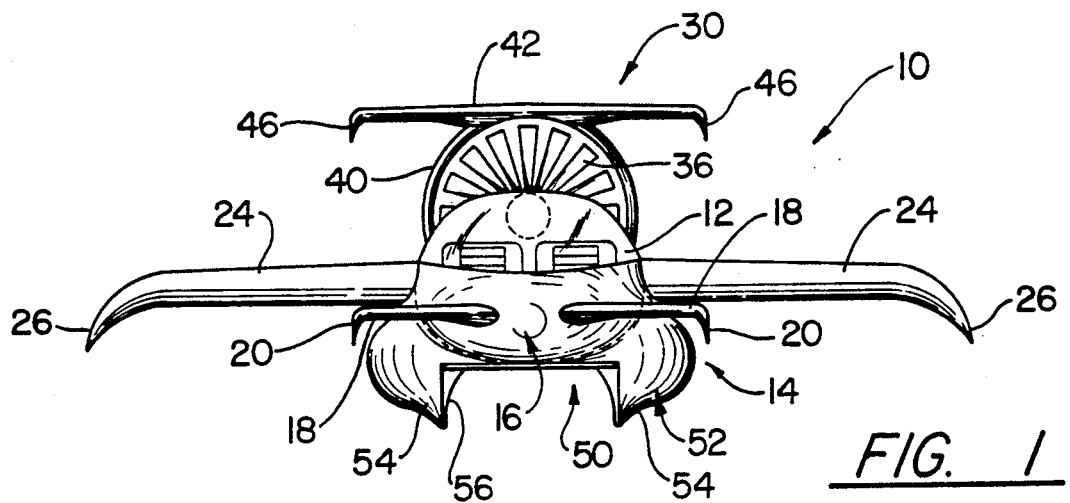
FIG. 1 is a front plan view of one embodiment of a near surface vehicle of the present invention.
Figure 2:
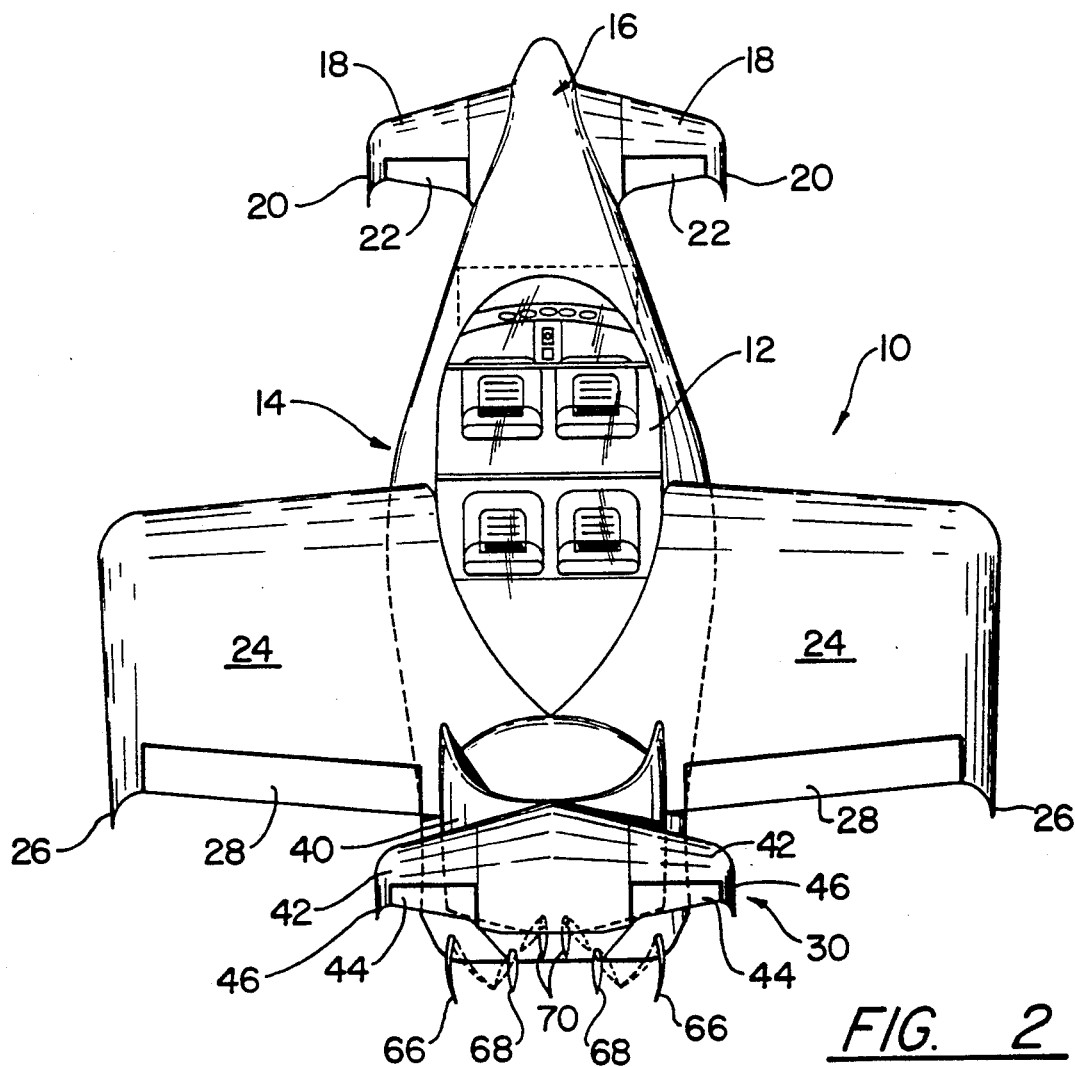
FIG. 2 is a top plan view of the near surface vehicle embodiment of FIG. 1.
Figure 3:
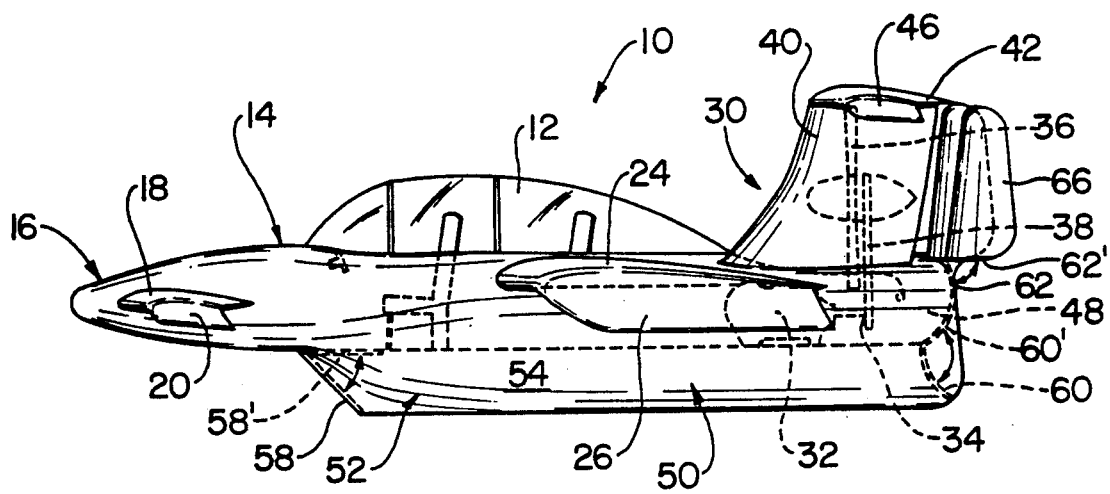
FIG. 3 is a side plan view of the near surface vehicle embodiment of FIG. 1.

Referring to FIGS. 1-3, a first embodiment of the near surface vehicle of the present invention is designated generally by the reference numeral 10. The near surface vehicle includes an enclosed cockpit or passenger compartment 12 formed as a portion of a main aerodynamic vehicle body 14.

The vehicle body 14 includes a nose section 16 which includes a first lift and pitch control airfoil or canard 18. The canard 18 includes a pair of downwardly extending endplates 2 to increase airfoil lift of the canard 18. The canard 18 also includes a pair of elevators 22 which are moved in a conventional manner to control the lift and pitch of the near surface vehicle 10.

The vehicle body 14 further includes a main lifting airfoil or wing 24. The wing 24 also includes a pair of downwardly extending endplates 26. The wing 24 also includes a pair of ailerons 28, which are moved in a conventional manner to provide lateral and roll control for the near surface vehicle 10. The wings 24 preferably are foldable upwards across the vehicle body 14 for trailering or otherwise transporting of the near surface vehicle 10.

The vehicle body 14 includes a tail section 30. The tail section 30 includes a power unit or engine 32. The power unit 32 drives a shaft and pulley arrangement 34, which in turn is coupled to a multiple blade fan 36 by a preferably cogged drive belt 38. The multiple blade fan 36 is enclosed in a fan housing 40, which fan housing 40 also has mounted thereon a tail airfoil or surface 42. The tail surface 42 again includes a pair of elevators 44, to provide a backup/auxiliary lift and pitch control for the primary lift and pitch control canard 18. The tail surface 42 also includes a pair of downwardly extending endplates 46, again to increase lift.

Figure 4:
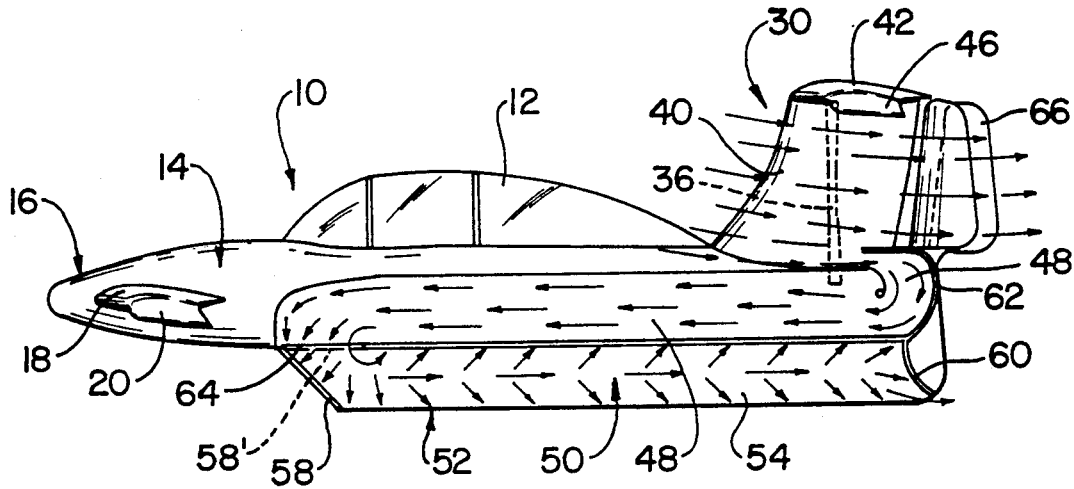
FIG. 4 is a side partial sectional view illustrating the air flow in the near surface vehicle embodiment of FIG. 1.

The multiple blade fan 36 provides a dual function for the near surface vehicle 10, providing both the initial lift air through a passageway or tunnel 48 integrated into the vehicle body 14, as best illustrated in FIG. 4, and also the thrust or propulsion force for the near surface vehicle 10. The initial lift air is directed into a controllable hull lift area 50, which lift area 50 is best illustrated with respect to FIGS. 1, 3 and 4.

The vehicle body 14 includes a hull 52 in which the lift area 50 is formed. The hull 52 is aerodynamically shaped and includes a pair of rigid sidewalls 54, which form a passageway 56 along the length of the hull 52 forming part of the lift area 50 and allowing water and air to flow therethrough when not in the initial lift stage. The sidewalls 54 also act as floats or pontoons for the near surface vehicle 10. The passageway 56 is closed by a pair of flaps, a front or forward flap 58 and a rear or aft flap 60 to form the initial lift area 50 as desired.

In the initial lift or startup stage, lift air from the multiple blade fan 36 is diverted into the passageway 48 by a movable deflector 62, which is pivoted to the closed position as illustrated in FIGS. 3 and 4. The initial lift air preferably can be about twenty-five (25) percent of the thrust air from the multiple blade fan 36 and is directed through the passageway 48 into the lift area 50 through an opening 64, which is formed toward the front of the lift area 50. This location provides two functions, first the initial lift air is directed into the front of the lift area 50 which prevents the near surface vehicle 10 from nosediving into the water (not illustrated). Secondly, the initial lift air is directed against the front or forward flap 58 to assist in sealing the lift area 50.

The initial lift air preferably will lift about ninety (90) percent of the weight of the near surface vehicle 10 to reduce drag and increase lift as the near surface vehicle 10 is moving up to cruising speed. The front or forward flap 58, preferably is an essentially freely pivotable flap, such that as forward speed is developed, the front or forward flap 58 will be pivoted upwardly against the vehicle body 14 and can be locked in that position 58', if desired. This provides the normal cruising position and the lift area 50 now is opened and the passageway 48 is non-functional, because the movable deflector 62 is pivoted upwardly to a position 62' to allow the fan air to be utilized fully for forward thrust/propulsion.

The aft or rear flap 60 is pivotably controllable from the compartment 12 and is pivoted upwardly to a position 60' for both cruising and reentry into the water or onto land. The rear or aft flap 60 also is pivoted to control the height of the air cushion to maintain operational stability of the near surface vehicle 10. If the near surface vehicle 10 is to be landed on a runway, beach or other land surface, preferably the sidewalls 54 include a plurality of wheels (again not illustrated).

When taxiing or when accelerating to cruising speed the near surface vehicle 10 is substantially out of the water, with only the bottom edges, about ten (10) percent of the initially wetted area of the near surface vehicle 10 immersed. At cruising speed the near surface vehicle 10 is clear of the water or other surface, but remains near the surface to maintain a ground effect operation. The near surface vehicle 10 also can lift higher above the water or land surface for short hops, such as to clear obstacles, as desired or necessary.

Referring to FIG. 2, the directional and reverse thrust control of the near surface vehicle 10 is best illustrated. A plurality of movable/pivotable vertical control surfaces, rudders or vanes 66, 68 and 70 are mounted in the thrust air pattern developed by the multiple blade fan 36. The vanes 66, 68 and 70 can be pivoted together in the same direction for lateral directional control of the near surface vehicle 10 in a conventional manner. Further, pairs of vanes 66 and 68 can be pivoted toward one another and the vanes 70 can be pivoted outwardly toward the vanes 68 to provide a very controlled reverse thrust for braking and maneuverability of the near surface vehicle 10. The vanes 66, 68 and 70 can be operated in pairs or independently to vary the reverse thrust pattern.

The near surface vehicle 10 preferably is designed from an all composite construction to provide a minimum vehicle weight. The vehicle structure wing and body structures can be formed from composite and foam sandwich construction utilizing S-glass, graphite, Kevlar and epoxy resins. S-glass preferably would be utilized for about ninety (90) percent of the composite elements, with graphite fibers utilized for stiffening purposes where desired. Kevlar preferably would be utilized around the hull and sidewalls 54, since it maintains structural integrity under heavy use. The hull 52 and sidewalls 54 preferably are filled with foam or sealed in air to provide the required flotation for the near surface vehicle 10.

One typical design for a four (4) passenger (one is the pilot) near surface vehicle 10 is as follows:

| | |
|---|---|
| EMPTY WEIGHT = | 1270 LBS |
| PILOT & PASSENGERS = | 680 LBS |
| BAGGAGE = | 120 LBS |
| FUEL = | 240 LBS |
| USEFUL LOAD = | 1040 LBS |
| GROSS WEIGHT = | 2310 LBS |
| NO. OF SEATS = | 4 |
| ENGINE POWER = | 90 H.P. |
| FAN SPEED = | 2500 RPM |
| STATIC THRUST = | 490 LBS |
| FAN DIAMETER = | 48 INCHES |
| AIRFOIL AREA = | 70 SQ FT |
| WING SPAN = | 20 FEET |
| AVERAGE CHORD = | 6.2 FT |
| CANARD AREA = | 7 SQ FT |
| CANARD SPAN = | 20 FEET |
| CANARD CHORD = | 1.9 FT |
| TAIL AREA = | 9 SQ FT |
| TAIL SPAN = | 8.0 FT |
| TAIL CHORD = | 1.9 FT |
| NO. OF ENGINES = | 1 |
| PERFORMANCE GOALS | |
| MAXIMUM SPEED = | 100 MPH |
| CRUISE SPEED = | 85 MPH |
| LIFT OFF SPEED = | 50 MPH |
| RANGE (NO RESERVE) = | 600 MILES |

The near surface vehicle 10 is configured for a small passenger load and has its main wing 24 located across the middle of the vehicle body 14. This configuration preferably is utilized on lakes and other relatively sheltered bodies of water. For larger loads and for high seas or rough water conditions, the main wing can be placed at a higher location on the vehicle body.

Figure 5:
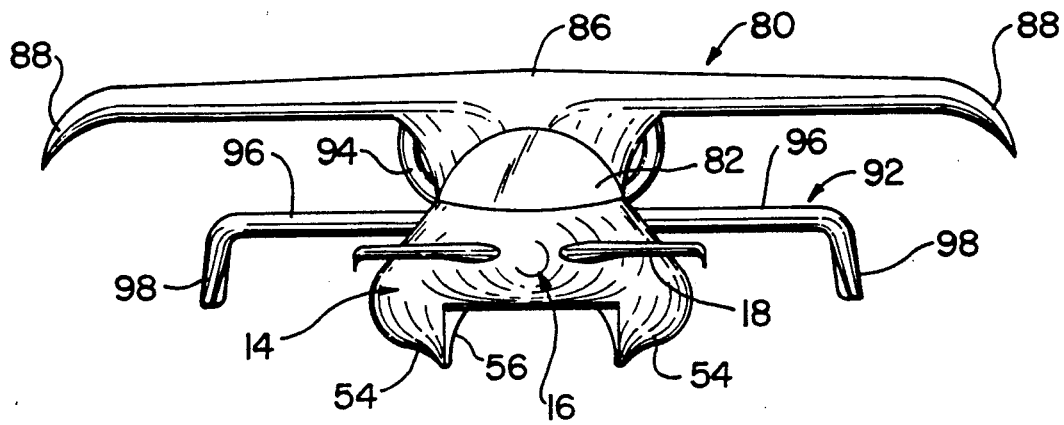
FIG. 5 is a front plan view of a second embodiment of the near surface vehicle of the present invention.
Figure 6:
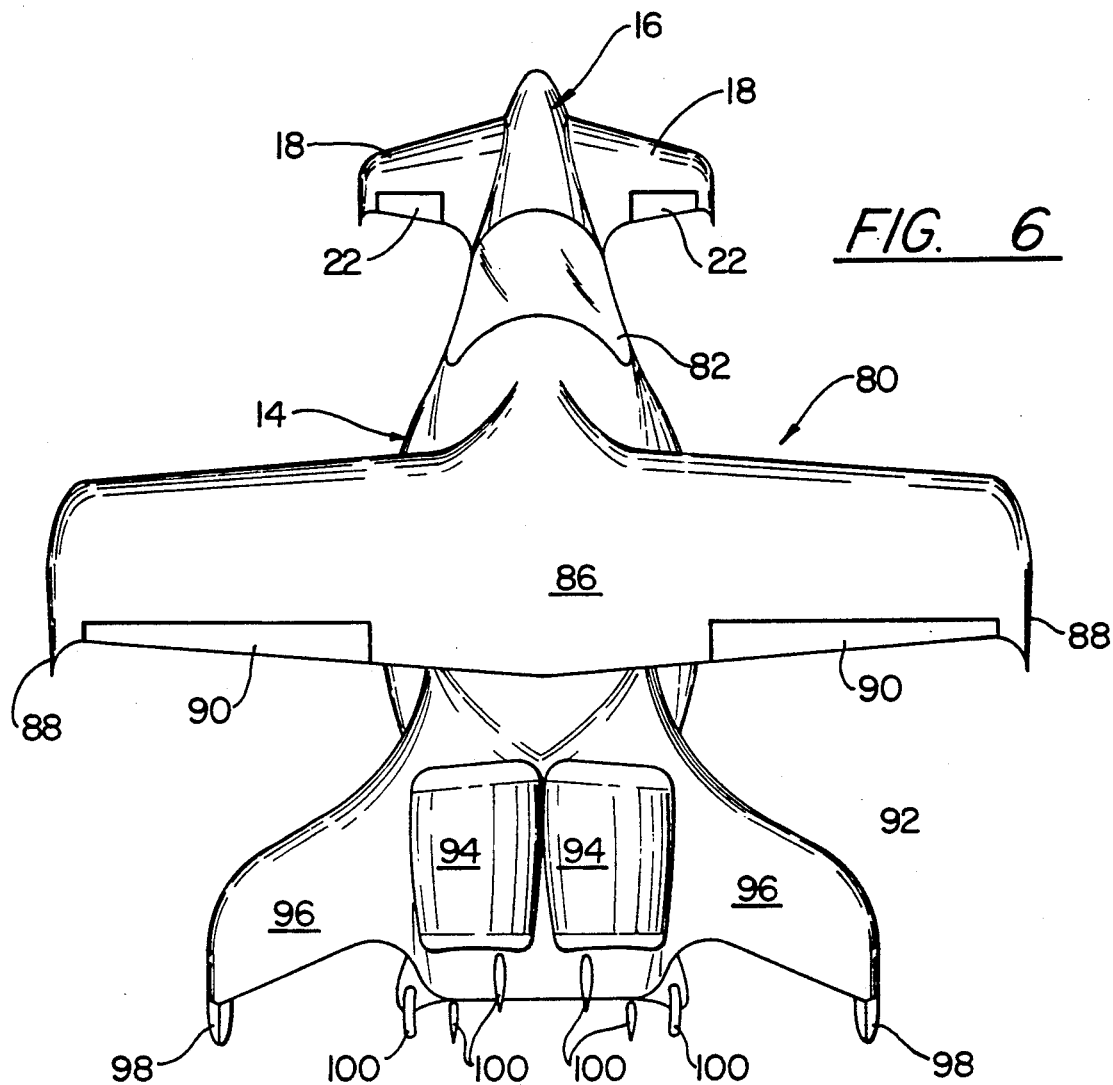
FIG. 6 is a top plan view of the near surface vehicle embodiment of FIG. 5.
Figure 7:
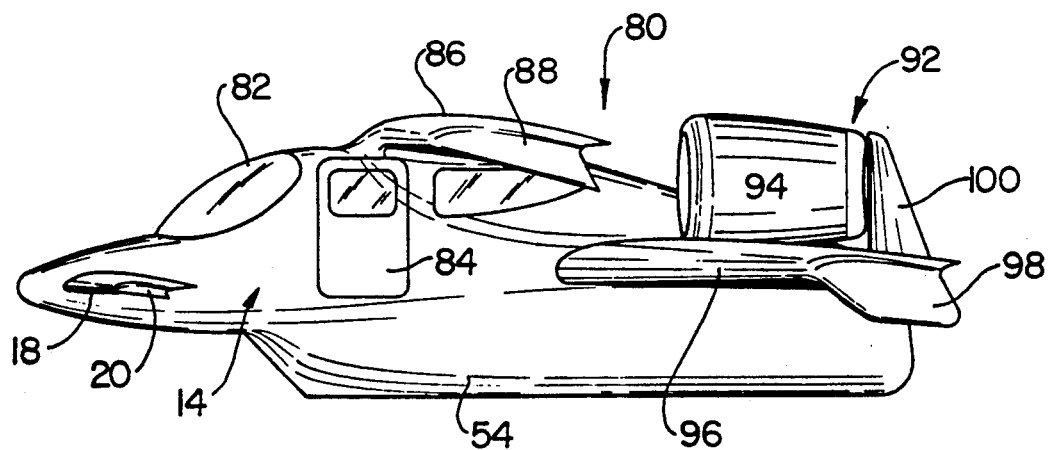
FIG. 7 is a side plan view of the near surface vehicle embodiment of FIG. 5.

One embodiment of a high wing near surface vehicle is designated generally by the reference numeral 80, best illustrated in FIGS. 5-7. The near surface vehicle 80, in the example illustrated, is designed as a six passenger vehicle which can be utilized in high seas conditions. Functionally, the operation of the near surface vehicle 80 is the same as that of the near surface vehicle 10 and in general similar elements are designated by the same elements as those utilized in describing the near surface vehicle 10.

The near surface vehicle 80 includes a larger cockpit 82, which is formed more integrally with the vehicle body 14 than the compartment 12. The cockpit 82 includes a side entry/exit door 84. A main wing 86 is mounted over a portion of the cockpit 82 and also includes a pair of endplates 88. Since the wing 86 and the endplates 88 are elevated with respect to the water surface (not illustrated), the near surface vehicle 80 has more wing clearance and more easily can be operated in rough seas. The wing 86 again includes a pair of ailerons 90. The wing 86 preferably is a substantially unitary structure, which is pivotable ninety (90) degrees over the length of the near surface vehicle 80 for trailering or otherwise transporting of the near surface vehicle 80.

The near surface vehicle 80 includes a large tail section 92, located substantially at the middle of the vehicle body 14. The tail section 92 can include one (not illustrated) or a pair of thrust fan units 94, placed on opposite sides of the vehicle body 14. Preferably, since the near surface vehicle 80 is designed for larger passenger loads and longer trips, two fan units 64 are utilized, each with a separate power unit (not illustrated). This provides half power for the near surface vehicle 80 if one of the fan units 94 or one of the power units malfunction.

The fan units 94 also are mounted above a tail surface 96, which tail surface 96 also includes a pair of endplates 98. The endplates 98 are located at the rear edge of the tail surface 96 to provide enhanced directional control as the near surface vehicle 80 is brought up to cruising speed. Further, the endplates 98 also act as floats or pontoons, which prevents the main wing 86 from dipping in cross winds or turns. The tail surface 96 and endplates 98 preferably are foldable up toward the vehicle body 14 for trailering or transport of the near surface vehicle 80. Direction and reverse thrust control again is provided by a plurality of vertical vanes or rudders 100.

Modification and variations of the present invention are possible in light of the above teachings. The forward flap 58 also can be a controllable flap if desired. The near surface vehicles 10 and 80 preferably include low aspect ratio (less than five (5)) airfoils and are most efficient when utilized with the endplates and hence preferably include the endplates. The low aspect ratio airfoils are preferred, because they lower the effective stall speed of the near surface vehicles 10 and 80, allow the near surface vehicles 10 and 80 to be more compact for use in restricted clearance areas, assist in preventing airfoil dipping during turns of the near surface vehicles 10 and 80 and they provide enhanced roll control at lower speeds. The near surface vehicle 10 preferably is utilized for low passenger uses, such as for recreational vehicles. The near surface vehicle 80 can be utilized for large passenger uses, such as a ferry operation and can be scaled up to accommodate the number of passengers desired, for example twenty-five (25) to thirty (30). It is therefore to be understood that within the scope of the appended claims, the invention may be practiced other than is specifically described.

I claim as my invention:

1. A near surface vehicle, comprising:
    a vehicle body including a nose section, a passenger cockpit and a tail section, said nose section including canard means, said canard means including elevator means for lift and pitch control and endplate means for increasing lift under ground effect conditions;
    said vehicle body including a main wing, said wing including aileron means for lift and roll control and endplate means for increasing lift under ground effect conditions;
    said tail section including a tail surface, said tail surface including elevator means for auxiliary lift and pitch control, endplate means for increasing lift under ground effect conditions, and including thrust fan means and means for powering said thrust fan means for providing thrust air for said near surface vehicle;
    said vehicle body including a pair of rigid hull sidewalls and means for forming a lift area between said sidewalls including means for adjusting said lift area;
    means for diverting a portion of said thrust air from said thrust fan means into said lift area to provide an initial lift force; and
    means for laterally directing said thrust air to control the direction of said near surface vehicle.

2. The near surface vehicle as defined in claim 1 wherein said diverting means include adjustable deflector means for diverting the desired portion of said thrust air into said lift area.

3. The near surface vehicle as defined in claim 2 wherein said adjustable deflector means directs said air into said lift area through a passageway formed in said vehicle body.

4. The near surface vehicle as defined in claim 3 wherein said air exits said passageway into a forward portion of said lift area.

5. The near surface vehicle as defined in claim 1 wherein said means for forming said lift area include forward flap means and aft flap means.

6. The near surface vehicle as defined in claim 5 wherein said forward flap means include means for locking said forward flap means against said vehicle body to substantially eliminate said lift area and to decrease drag after an initial lifting phase.

7. The near surface vehicle as defined in claim 6 wherein said thrust air is directed into said lift area against said forward flap means in an initial lifting stage.

8. The near surface vehicle as defined in claim 5 wherein said aft flap means include means for controlling the position of said aft flap means to form and control said lift area.

9. The near surface vehicle as defined in claim 1 wherein said thrust air directing means include movable vane means to direct said thrust air to control said near surface vehicle direction.

10. The near surface vehicle as defined in claim 9 wherein said vane means include rudders which can be pivoted toward one another to provide reverse thrust for said near surface vehicle.

11. The near surface vehicle as defined in claim 1 wherein said main wing is mounted substantially midway on said vehicle body and said tail surface is mounted on a top portion of said tail section.

12. The near surface vehicle as defined in claim 1 wherein said main wing is mounted substantially above said cockpit and said tail surface is mounted substantially midway on said vehicle body.

13. The near surface vehicle as defined in claim 1 wherein said diverting means include adjustable deflector means for diverting the desired portion of said thrust air into said lift area through a passageway formed in said vehicle body and said air exits said passageway into a forward portion of said lift area.

14. The near surface vehicle as defined in claim 13 wherein said means for forming said lift area include forward flap means and aft flap means, said thrust air is directed into said lift area against said forward flap means in an initial lifting stage and said forward flap means include means for locking said forward flap means against said vehicle body to substantially eliminate said lift area and to decrease drag after said initial lifting stage.

15. The near surface vehicle as defined in claim 14 wherein said aft flap means include means for controlling the position of said aft flap means to form and control said lift area.

16. A near surface vehicle, comprising:

a vehicle body including a nose section, a passenger cockpit and tail section, said nose section including canard means, said canard means including elevator means for lift and pitch control and endplate means for increasing lift under ground effect conditions;

said vehicle body including a main wing, said wing including aileron means for lift and roll control and endplate means for increasing lift under ground effect conditions;

said tail section including a tail surface, said tail surface including elevator means for auxiliary lift and pitch control and endplate means for increasing lift under ground effect conditions, and including thrust fan means and means for powering said thrust fan means for providing thrust air for said near surface vehicle;

said vehicle body including a pair of rigid hull sidewalls and means for forming a lift area between said sidewalls including means for adjusting said lift area, including forward flap means and aft flap means, said aft flap means including means for controlling the position of said aft flap means to form and control said lift area, said forward flap means including means for locking said forward flap means against said vehicle body to substantially eliminate said lift area and to decrease drag after an initial lifting phase, after which said vehicle is travelling under ground effect conditions;

means for diverting a portion of said thrust air from said thrust fan means into said lift area to provide an initial lift force including adjustable deflector means for diverting the desired portion of said thrust air into said lift area through a passageway formed in said vehicle body into a forward portion of said lift area against said forward flap means in an initial lifting stage; and means for laterally directing said thrust air to control the direction of said near surface vehicle including movable vane means to direct said thrust air to control said near surface vehicle direction.

17. The near surface vehicle as defined in claim 16 wherein said vane means include rudders which can be pivoted toward one another to provide reverse thrust for said near surface vehicle.

18. The near surface vehicle as defined in claim 16 wherein said main wing is mounted substantially midway on said vehicle body and said tail surface is mounted on a top portion of said tail section.

19. The near surface vehicle as defined in claim 16 wherein said main wing is mounted substantially above said cockpit and said tail surface is mounted substantially midway on said vehicle body.

* * * * *